(12) United States Patent
Barrow et al.

(10) Patent No.: US 9,268,665 B2
(45) Date of Patent: Feb. 23, 2016

(54) SYSTEM AND METHOD FOR IDENTIFYING FAULT PRONE COMPUTER CODE FILES

(75) Inventors: Flint Barrow, Atlanta, GA (US); Simone Nicolo, Boulder, CO (US)

(73) Assignee: Trimble Navigation Limited, Sunnyvale, CA (US)

( * ) Notice: Subject to any disclaimer, the term of this patent is extended or adjusted under 35 U.S.C. 154(b) by 507 days.

(21) Appl. No.: 13/190,599

(22) Filed: Jul. 26, 2011

(65) Prior Publication Data

US 2013/0031423 A1    Jan. 31, 2013

(51) Int. Cl.
*G06F 9/44* (2006.01)
*G06F 11/36* (2006.01)

(52) U.S. Cl.
CPC .............. *G06F 11/3616* (2013.01); *G06F 8/77* (2013.01)

(58) Field of Classification Search
None
See application file for complete search history.

(56) References Cited

U.S. PATENT DOCUMENTS

| | | | |
|---|---|---|---|
| 5,754,860 A | 5/1998 | McKeeman et al. | |
| 5,805,795 A | 9/1998 | Whitten | |
| 6,249,882 B1 | 6/2001 | Testardi | |
| 6,895,578 B1 | 5/2005 | Kolawa et al. | |
| 7,055,067 B2 | 5/2006 | DiJoseoph | |
| 7,107,182 B2 | 9/2006 | Fujikawa et al. | |
| 7,246,134 B1 | 7/2007 | Kitain et al. | |
| 7,278,130 B2 | 10/2007 | Iborra et al. | |
| 7,296,264 B2 | 11/2007 | Zatloukal et al. | |
| 7,392,507 B2 | 6/2008 | Kolawa et al. | |
| 7,401,031 B2 | 7/2008 | Hughes | |
| 7,555,742 B2 | 6/2009 | Iborra et al. | |
| 7,681,180 B2 | 3/2010 | de Halleux et al. | |
| 7,941,438 B2 | 5/2011 | Molina-Moreno et al. | |
| 8,006,204 B2 | 8/2011 | Killian et al. | |
| 8,028,276 B1 | 9/2011 | Bessonov | |
| 8,191,048 B2 | 5/2012 | Parthasarathy et al. | |
| 8,225,302 B2 * | 7/2012 | Waugh et al. | 717/170 |
| 8,448,146 B2 | 5/2013 | Pasala et al. | |
| 8,601,436 B2 | 12/2013 | Park et al. | |
| 8,776,010 B2 | 7/2014 | Fisher et al. | |
| 2003/0041288 A1 | 2/2003 | Kolawa et al. | |
| 2003/0145312 A1 | 7/2003 | Bates et al. | |
| 2008/0307269 A1 | 12/2008 | Bennett et al. | |

(Continued)

FOREIGN PATENT DOCUMENTS

EP    1926021    5/2008

OTHER PUBLICATIONS

Gall et al, "Detection of Logical Coupling Based on Product Release History", 1998, Software Maintenance.*

(Continued)

*Primary Examiner* — Jason Mitchell
*Assistant Examiner* — Christine Dang
(74) *Attorney, Agent, or Firm* — Sheridan Ross P.C.

(57) ABSTRACT

Metrics associated with computer code files within a codebase may be analyzed to identify bug-prone files. Functions of the method or system may determine metrics corresponding to each file of a plurality of codebase files within an application codebase. The functions may also store the metrics corresponding to each codebase file in a record of a database table, rank order the plurality of codebase files according to at least one metric, and flag each codebase file having a ranking over a threshold value of the metric. The codebase file metrics may describe fault-inducing characteristics of the plurality of codebase files and include both a total number of previous faults and a total number of changes that are associated with each codebase file.

17 Claims, 5 Drawing Sheets

(56) References Cited

U.S. PATENT DOCUMENTS

| | | | |
|---|---|---|---|
| 2008/0320438 A1 | 12/2008 | Funto et al. | |
| 2009/0070746 A1 | 3/2009 | Dhurjati et al. | |
| 2009/0094580 A1 | 4/2009 | Bank et al. | |
| 2009/0132995 A1 | 5/2009 | Iborra et al. | |
| 2009/0217302 A1 | 8/2009 | Grechanik et al. | |
| 2009/0282136 A1 | 11/2009 | Subramanian | |
| 2009/0313505 A1 | 12/2009 | McCroskey et al. | |
| 2009/0313605 A1* | 12/2009 | Ostrand et al. ............... | 717/124 |
| 2010/0083069 A1 | 4/2010 | Wylie et al. | |
| 2010/0242015 A1 | 9/2010 | Stenberg et al. | |
| 2010/0325620 A1 | 12/2010 | Rohde et al. | |
| 2011/0016453 A1 | 1/2011 | Grechanik et al. | |
| 2011/0016457 A1 | 1/2011 | Artzil et al. | |
| 2011/0022551 A1* | 1/2011 | Dixon ............................ | 706/12 |
| 2011/0161932 A1* | 6/2011 | Nagappan et al. ............ | 717/122 |
| 2011/0166969 A1 | 7/2011 | Hughes | |
| 2013/0106880 A1 | 5/2013 | Williams | |
| 2013/0152047 A1 | 6/2013 | Moorthi et al. | |
| 2014/0007043 A1 | 1/2014 | Aliseychik et al. | |

OTHER PUBLICATIONS

Hatton, "Reexamining the Fault Density—Component Size Connection", 1997, IEEE Software.*

Marinescu, "Detection Strategies: Metrics-Based Rules for Detecting Design Flaws", 2004, Proceedings of the 20th IEEE International Conference on Software Maintenance.*

Bevan et al., "Identification of Software Instabilities," Proc. of 2003 Working Conference on Reverse Engineering (WCRE2003), Victoria, Canada, 2003, 10 pages.

Cubranic, et al., "Hipikat: Recommending Pertinent Software Development Artifacts," Proc. of 25th International Conference on Software Engineering (ICSE), Portland, Oregon, 2003, pp. 408-418.

Fischer et al., "Populating a Release History Database from Version Control and Bug Tracking Systems," Proc. of 2003 Int'l Conference on Software Maintenance (ICSM'03), 2003, pp. 23-32.

Gall et al., "CVS Release History Data for Detecting Logical Couplings," Proc. of Sixth International Workshop on Principles of Software Evolution (IW-PSE'03), 2003, pp. 13-23.

Graves, et al., "Predicting Fault Incidence Using Software Change History," IEEE Transactions on Software Engineering, vol. 26, No. 7, Jul. 2000, pp. 653-661.

Hassan et al., "The Top Ten List: Dynamic Fault Prediction," Proc. of International Conference on Software Maintenance (ICSM 2005), Budapest, Hungary, 2005, pp. 263-272.

Kim et al., "Automatic Identification of Bug-Introducing Changes," Proc, of 21$^{st}$ IEEE International Conference on Automated Software Engineering (ASE 2006), Tokyo, Japan, 2006.

Ko et al., "A Framework and Methodology for Studying the Causes of Software Errors in Programming Systems," Journal of Visual Languages and Computing, vol. 16, 2005, pp. 41-84.

Mockus et al., "Identifying Reasons for Software Changes Using Historic Databases," Proc. of International Conference on Software Maintenance (ICSM 2000), San Jose, California, 2000, pp. 120-130.

Nagappan et al., "Use of Relative Code Churn Measures to Predict System Defect Density," Proc. of 2005 Int'l Conference on Software Engineering (ICSE 2005), St. Louis, Missouri, May 15-21, 2005, pp. 284-292.

Ostrand et al., "Predicting the Location and Number of Faults in Large Software Systems," IEEE Transactions on Software Engineering, vol. 31, No. 4, Apr. 2005, pp. 340-355.

Sliwerski, et al., "When Do Changes Induce Fixes'?," Proc. of Int'l Workshop on Mining Software Repositories (MSR 2005), St. Louis, Missouri, May 17, 2005, 5 pages.

Kim et al., "Predicting Faults from Cached History," IEEE, 29th International Conference on Software Engineering (ICSE'07), 2007, 10 pages.

International Search Report and Written Opinion for Application No. PCT/US2012/046949, dated Dec. 27, 2012.

U.S. Appl. No. 13/216,401, filed Aug. 24, 2011, Nicolo.

U.S. Appl. No. 13/205,828, filed Aug. 9, 2011, Lininger.

"Parameterized Unit Testing with Microsoft Pex: Advanced Tutorial for Automated Whitebox Testing for >NET Applications," Version 0.93, Aug. 3, 2010, 48 pages.

Arrington Jr. "Improving Software Testing through Code Parsing," Virginia Space Grant Consortium Student Research Conference, Apr. 9, 2009, Hampton University, Hampton, Virginia, 5 pages.

Mangold et al. "Automatic Unit Testing of SAS Programs with SASUnit," PhUSE Conference, 2008, 11 pages.

Sliwerski et al. "When Do Changes Induce Fixes?" Proc. of Int'l Workshop on Mining Software Repositories (MSR 2005), St. Louis, Missouri, May 17, 2005, 5 pages.

Official Action for U.S. Appl. No. 13/205,828, mailed Jan. 31, 2014 15 pages.

Official Action for U.S. Appl. No. 13/205,828, mailed Jul. 7, 2014 16 pages.

Official Action for U.S. Appl. No. 13/216,401, mailed Mar. 14, 2014 23 pages.

Official Action for U.S. Appl. No. 13/216,401, mailed Sep. 19, 2014 62 pages.

Fetzer et al. "An Automated Approach to Increasing the Robustness of C Libraries," IEEE, 2002, Proceedings of the International Conference on Dependable Systems and Networks, 10 pages.

Shafique et al. "A Systematic Review of Model Based Testing Tool Support," Carleton University, Technical Report SCE -10-04, May 2010, 21 pages.

Torchiano "Documenting Pattern Use in Java Programs," IEEE, 2002, Proceedings of the International Conference on Software Maintenanced, 4 pages.

Trucchina "Refactoring Tools—Chapter 6 of 'Pro PHP Refactoring'" Springer, 2010, pp. 63-84.

Notice of Allowance for U.S. Appl. No. 13/205,828, mailed Jan. 21, 2015 12 pages.

Official Action for U.S. Appl. No. 13/216,401, mailed Apr. 1, 2015 48 pages.

* cited by examiner

300

| File ID | Changelist ID | Code Lines | Last change time | Total number of changes | Change Density | Total Number of Bugs | Bug Density | Avg. Rank |
|---|---|---|---|---|---|---|---|---|
| foo4.cpp | x524 | 1832 | 8/22/11 6:57 | 25 | 0.0136 | 5 | 0.0027 | 1 |
| foo10.cpp | f986 | 1254 | 8/3/11 10:33 | 10 | 0.0080 | 7 | 0.0056 | 2 |
| foo6.cpp | a324 | 1023 | 1/20/11 7:40 | 12 | 0.0117 | 3 | 0.0029 | 3 |
| foo87.cpp | d543 | 541 | 1/25/11 11:16 | 7 | 0.0129 | 4 | 0.0074 | 4 |
| foo22.cpp | b754 | 65 | 4/30/10 13:12 | 1 | 0.0154 | 5 | 0.0769 | 5 |
| foo14.cpp | k529 | 20 | 5/27/10 5:16 | 5 | 0.2500 | 3 | 0.1500 | 6 |

| File ID | Changelist ID | Logical Coupling Relatives | Spatial Relatives |
|---|---|---|---|
| foo4.cpp | x524 | x | x |
| foo10.cpp | f986 | x | x |
| foo6.cpp | a324 | x | x |
| foo87.cpp | d543 | x | x |
| foo22.cpp | b754 | x | x |
| foo14.cpp | k529 | x | x |

FIG. 4

SYSTEM AND METHOD FOR IDENTIFYING FAULT PRONE COMPUTER CODE FILES

FIELD OF TECHNOLOGY

The present disclosure relates generally to identifying fault prone computer code and more specifically to a system and a method configured analyze metrics associated with codebase code files to identify files that are most likely to cause faults when executed.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Complex software applications often require massive collections of source code files organized within codebases. Codebases are usually created by engineers, software developers, and other technicians who write individual code files describing the application's modules, methods, functions, etc. These files are included within the application's codebase. To keep the files organized, the codebase may be conceptually maintained in a tree structure maintained by a version control system. Within the code tree, a branch generally describes a version of an application module that was changed, but does not include any new features, while a trunk may include a module with new features. Teams of engineers design, develop and deploy software across distant locations. Multiple versions of software files are often deployed from these different locations while other developers work on updates to the same files. Errors or "bugs" may only be present in certain versions, therefore to locate and fix any bugs, particular versions of the software must be located and tested to determine which version(s) are causing the problem.

During the lifetime of an application, software developers commit or merge multiple file versions, patches, edits, etc., to the codebase. These commit operations tell the version control system that a group of changes will be made final and available to all users. That group of changes is typically maintained in a change list. Each group of changes in a single commit action includes a unique change list ID.

Of course, whenever a software developer performs a commit action, he or she also possibly introduces bugs to the codebase. To counter the inevitable introduction of bugs, most software development teams are complimented by a quality assurance team to perform automated and manual testing of the files within the codebase. Ideally, quality assurance teams perform tests on the submitted files until the codebase reaches a confirmed level of code maturity and stability. However, because the complex development and execution relationships between the various files in the code tree, it is difficult to measure an exact level of quality assurance. For example, development of an application follows numerous paths along the code tree including various branches and trunks during the development cycle. Accounting for and writing tests for every possible code path in a complex application would consume a significant amount of resources and time. Further, it has been observed that bugs are not distributed linearly within a codebase, but rather, bugs occur in "bursts" where a single bug causes multiple, other bugs in a cascading effect throughout the code base. Thus, testing a percentage of the total amount of code within the codebase will not account for an equal percentage of the total number of bugs that are present in the codebase (i.e., scanning fifty percent of the total amount of code within the codebase will not account for fifty percent of the total bugs in the codebase).

Some techniques to identify and analyze bugs within a codebase have focused on providing a Boolean indicator of whether a particular piece of the codebase was more or less likely to include a bug. For example, cache techniques may rank files within a codebase according to the number of lines of code within the file. Then, each of the ranked files and its closest relatives may receive a "hit" if it had been changed to fix a bug. Files that have been fixed most recently may remain in the cache, while those that have been changed less recently may be removed from the cache. These techniques allow a "hit or miss" identification of fault-prone files within a cache selection of the codebase.

SUMMARY

A computer-implemented method or a computer system or a computer-readable medium storing a set of instructions for execution on a processor operates to identify fault-prone code by determining, ranking, and analyzing metrics associated with codebase code files. Functions of the method or system or stored on a computer-readable medium may determine metrics corresponding to each file of a plurality of codebase files within a codebase for an application. The functions may also store the metrics corresponding to each codebase file in a record of a database table, rank order the plurality of codebase files according to at least one metric, and flag each codebase file having a ranking over a threshold value of the metric. The codebase file metrics may describe fault-inducing characteristics of the plurality of codebase files and include both a total number of previous faults and a total number of changes that are associated with each codebase file.

In some embodiments, the computer-implemented method or computer system or computer-readable medium storing a set of instructions for execution on a processor operates to detect a change to the plurality of codebase files and update the metrics corresponding to each file of the plurality of codebase files. Some embodiments may then continuously rank order the plurality of codebase files according to the updated metrics to account for fault-inducing changes to the codebase files.

The metrics may further include one or more of a file ID, a change list ID, a number of lines of code within the file, a time the file was last edited, a change density, a total number of faults, a fault density, logical coupling relatives, and spatial relatives. The change density may include a number of times the file has been changed compared to the number of lines of code within the file and the fault density may include the total number of faults compared to the number of lines of code within the file. The logical coupling relatives may include a measurement of a number of times a file is changed in conjunction with a change action for another file in the codebase, while the spatial relatives may include a measurement of a number of times a file is changed in conjunction with a change action for another file in a same folder or package as the file.

In further embodiments, rank ordering the plurality of codebase files may include determining a weighted average of the metrics for each codebase file and ranking the plurality of codebase files according to the weighted average. Further, rank ordering may include a subset of the plurality of codebase files that are ranked according to at least one metric. The subset may include a folder, an extension, a feature, or a package of a codebase file.

In still further embodiments, the system may include a processor and a memory that stores various structures and modules to identify fault-prone code. For example, a version control module may be stored in the memory and have an API defining functions that are executable by the processor to store codebase files within a codebase and manage a change list for tracking changes to the codebase files. Also, a database may be stored in the memory and include a plurality of records that each store a set of metrics corresponding to each codebase file stored in the codebase. A bug organizer module may be stored in the memory and have an API defining functions that are executable by the processor to determine the sets of metrics for each codebase file, store the sets of metrics in the records, and rank order the codebase files within a table of the database according to the sets of metrics.

The features and advantages described in this summary and the following detailed description are not all-inclusive. Many additional features and advantages will be apparent to one of ordinary skill in the art in view of the drawings, specification, and claims hereof. Additionally, other embodiments may omit one or more (or all) of the features and advantages described in this summary.

BRIEF DESCRIPTION OF THE DRAWINGS

FIG. 3 is one example of a database table used to identify fault-prone code;

FIG. 4 is another example of a database table used to identify fault-prone code;

DETAILED DESCRIPTION

Generally speaking, a debugging system and method may identify files within a codebase that are most likely to include bugs by measuring and analyzing particular metrics that are associated with each file in the codebase. The file metrics may be associated with a version history of the codebase and include a plurality bug localities and heuristics as described below.

Figure 1:
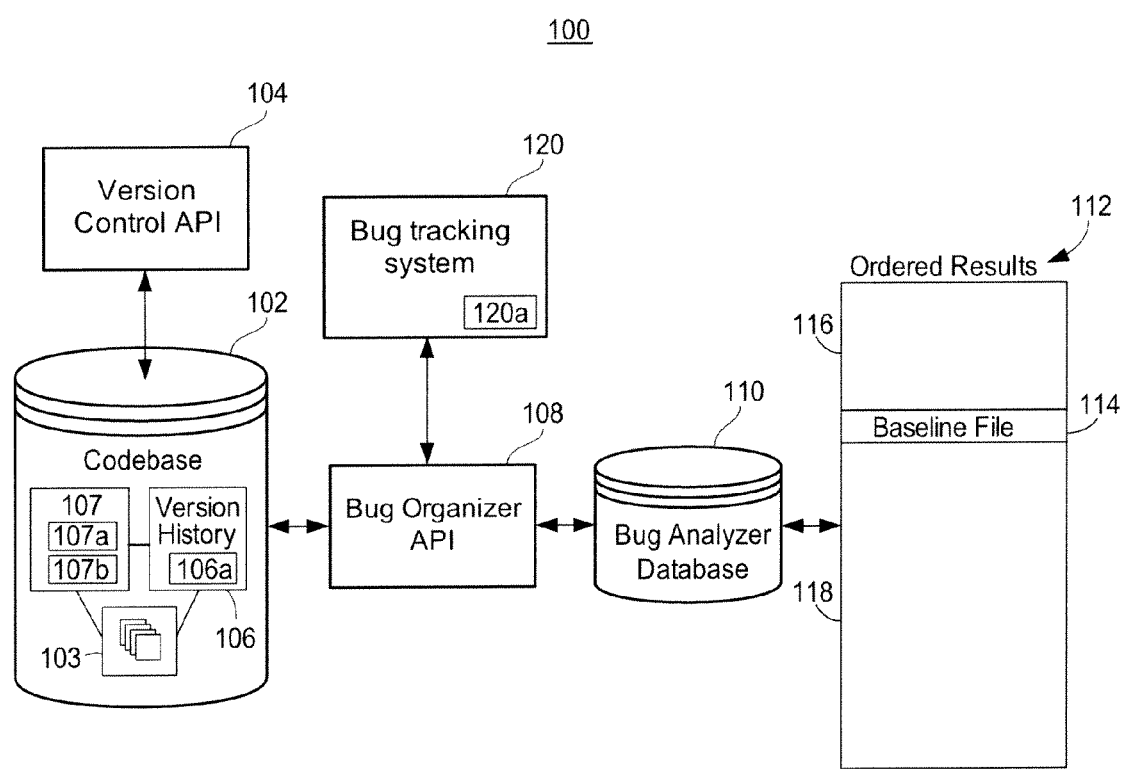
FIG. 1 is a high-level block diagram of a system for identifying fault prone files within an application codebase.

FIG. 1 is a high-level bock diagram that illustrates a system 100 for analyzing code from a codebase 102 to identify files 103 and code that are most likely to include bugs. Generally, a version control API 104 may perform commit operations to store code files 103 within the codebase 102 or to re-save code files 103 that were edited from within the codebase 102. The version control API 104 may also manage a version history 106 of the codebase 102. The version history 106 may include a plurality of unique identifiers that are conceptually related to one another and describe a code tree 106a for the application code stored in the codebase 102. The version history 106 may also include a change list 107 for tracking all changes made to codebase files. In some embodiments, the change list 107 includes a change list ID 107a and comments 107b for each codebase file 102 that is changed. For example, a developer may edit code within a file or group of files 102 and initiate a commit action with comments about the changes made using the version control API 104. The API 104 may then assign a change list ID 107a corresponding to the changed files 102 and comments 107b. The version history 106 may also be updated in the code tree 106a.

The version control API 104 may also associate the change list ID 107a, comments 107b, and metrics with the code files when a developer, automatic code generator, or other entity or device performs the commit action or other action (e.g., an edit action, a bug counting action, etc.) with the code file 103. A bug organizer API 108 may identify and extract codebase files from the codebase 102 that have one or more metrics associated with the files. The bug organizer API 108 may then organize the extracted codebase files into a database 110 according to the file metrics. The database 110 may then sort and order the extracted codebase files into an ordered set of codebase files 112 according to the metrics. A member of the ordered set 112 may be selected as a baseline file 114 that includes a value of the metrics such that those files having a value above 116 or below 118 the value of the baseline file 114 metrics are identified as most likely to include bugs. A quality assurance team may then focus their attention on only those codebase files that are most likely to include bugs. A bug tracking system 120 may also maintain a bug list 120a having identifiers that reference one or more bugs that have been identified and/or fixed within the codebase files 103. Where the bug list 120a includes an identifier corresponding to a fixed bug, a change list ID 107a may also correspond to the bug list 102a.

Figure 2:
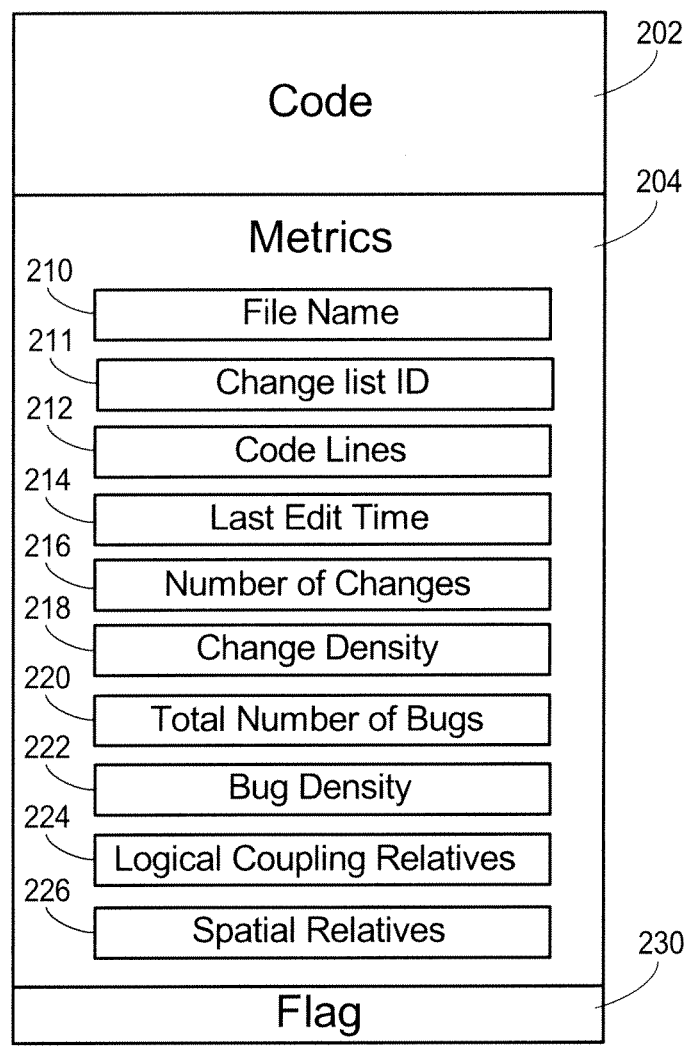
FIG. 2 is an exemplary block diagram of a codebase file.

FIG. 2 is a block diagram of one embodiment of a codebase file 200. In some embodiments, the codebase file 200 may include two main components: code 202 and metrics 204. The code 202 may include text and other instructions that may be compiled and executed on a computer. In some embodiments, the code 202 includes text instructions in a high-level programming language such as Java®, C, or other languages. Generally, the code 202 is written in a programming language that facilitates the developer's task to create computer-executable procedures. Executing a commit action with a version control API 104 or other module may associate the metrics 204 with the code 202 and both the code 202 and metrics 204 may be stored in the codebase 102 as a codebase file 200 organized by the version history 106.

The metrics 204 may include any information that is useful to identify bug-prone codebase files. In some embodiments, the metrics 204 include a file ID 210, a change list ID 211, a number of lines of code within the file 212, a time the file was last edited 214, a number of times the file has been changed 216, a change density 218 (i.e., a number of times the file has been changed compared to the number of lines of code within the file), a total number of bugs found in the file 220, a bug density 222 (i.e., a number of bugs found in the file compared to the number of lines of code within the file), logical coupling relatives 224, and spatial relatives 226.

A version control API 104 may associate a change list ID 211 with the file 200. In some embodiments, the API 104 associates a unique change list ID with any file that is added to the codebase 102 in a commit action. For example, the API 104 may execute a commit action to add several files to the codebase 102 that have been edited by a developer merely to add or remove features or to correct a fault. The version control API 104 may attach comments 107b to each changed file or to a particular change list ID 211 that indicate whether the file or files associated with that change list ID were edited to add or remove features or to correct a fault.

The lines of code 212 metric may indicate a file having more bugs because files with more lines of code tend to contain more bugs. While bugs are not evenly distributed throughout the codebase 102, a file having a high the number of code lines may be a good indicator that the file will also contain bugs. Additionally, longer files may also be harder for a developer to understand and increase the likelihood of a fault within the file.

The last edit time 214 metric may be selected as an indicator that a bug may have been introduced to the file because older files are more likely have had their bugs fixed than newer files. If a file has not been modified in a long time, then it is more likely that the file has stabilized and is not a source of bugs.

The number of changes 216 metric may also be used to identify bug-prone code files because more changes increase the opportunities for introducing bugs to the file.

The change density 218 metric may be selected to balance the effect of file length 212 against the number of changes 216. A file may be changed many times because it is very large. However, a small file that is changed often may indicate a greater opportunity for bug introduction across a small number of code lines. The change density 218 may be a measure of the number of changes versus the number of lines of code 212 in the file.

The total number of bugs found 220 metric may indicate that an associated file is bug prone. In some embodiments, the metric 220 may be incremented whenever the file 200 is associated with a change that fixes a bug. For example, in a commit action, the version control API 104 may associate a change list ID 107a and comments 107b with any file 200 that is edited. The bug organizer API 108 may search the comments 107b for any word, phrase, or symbol that indicates the file 200 corresponding to the change list ID 107a and comments 107b was edited to fix a bug. In some embodiments, the API 108 searches the comments 107b for words such as bug, fix, repair, patch, error, fault, etc., that indicate that the comments 107b are associated with a file 200 that has been changed to fix a bug. Further, an identifier of the bug list 120a may also correspond to a change list ID 107a and, thus, contribute to the total number of bugs found 220 metric. In other words, a file 200 that, at least at one time, included a bug, is more likely to continue to have a bug.

The bug density 222 metric accounts for the number of bugs in the file 200 against the number of code lines 212 in the same file 200. For example, a file 200 including many thousands of lines of code 212, but only three total bugs 220 may be much less bug prone than a file including only five lines of code 212 and two total bugs 220. The bug density 222 may be a measure of the total number of bugs versus the number of lines of code 212 in the file.

The logical coupling relatives 224 include a metric to assess how many times the file 200 was changed in conjunction with other files. For example, files that are changed at the same time often share resources or rely on each other in some way during execution. Therefore, a change in any file that relies on another file during execution may introduce bugs in that other file. Further, two files that are changed at the same time may also introduce bugs in those two files. In some embodiments, associating file IDs and a change list ID may indicate a number of files that were changed at the same time. The logical coupling relatives 224 may be ranked according to the smallest coupling distance. For example, a coupling distance between two files fileA and fileB is equal to:

$$\frac{1}{\text{number of times } fileA \text{ and } fileB \text{ were changed together}}.$$

Thus, files 103 that were never changed together have an infinite coupling distance, while two files that were changed together twenty times, for example, have a coupling distance of $\frac{1}{20}(=0.05)$. Smaller distances indicate that the logical coupling 224 is stronger. After you pick a number of files with the smallest distance from fileA, for example, an average bug likelihood for that number of files may be added to the bug likelihood for fileA. How likely it is that a change in fileA will cause a bug may depends on how bug prone are the files that are logical coupling relatives to fileA.

When the bug likelihood is averaged for a number of the "closest" files to fileA, using a bug likelihood that comes from the number of "closest" files to calculate a logical coupling might cause endless recursions. For example, if the ten files logically coupled to fileA are {fileB, fileC, fileD, . . . , fileJ, fileK}, using the logical coupling metric to calculate the files' bug likelihood might result in the bug likelihood of fileA depending on the bug likelihood of fileB, and the bug likelihood of fileB depending on the bug likelihood of fileA (i.e., if fileA is logically coupled with fileB, fileB is also logically coupled with fileA). To avoid this computational issue, the bug likelihood that depends on logical coupling relatives of fileA should not be used when averaging the bug likelihood of the logical coupling relatives of fileA.

The spatial relatives 226 include a metric to assess the relatives of files that are in the same package or folder within the codebase 102. Much like logical coupling 224, a file within the same package or folder as another file may cause bugs in that other file. In some embodiments, associating file ID, package IDs, folder IDs, extensions, etc., to a change list ID may indicate a number of files that were changed at the same time and within the same file, package, folder, etc. A spatial relative depends on the logical coupling distance as described above except that the compared files need to be in the same folder/package in the codebase 102. In other words, calculating spatial relatives 226 requires that files have a small or "closest" coupling distance and the files need to be in the same folder/package.

FIGS. 3 and 4 illustrate embodiments of data tables 300 and 400 that may be created from the codebase files 103 and include at least some of the metrics described above. The data tables 300 and 400 may include data related to all of the codebase files 103 to allow each file within the codebase to be ranked against all other codebase files 103 according to the metrics described above. In some embodiments, the bug organizer API 108 may be trained on the code tree 106a to identify each folder, extension, feature, etc., of the codebase 102 and organize the files according to the metrics described above into a database 110 including one or more data tables 300 and 400. Within the tables 300 and 400, a file may be ranked based on any of the metrics 310, 312, 314, 316, 318, 320, 322, 324, 402, and 404 or a weighted combination of the metrics to create an ordered results list 112 of the database tables 300 and 400. Also, using a database 110 including all of the codebase files 103, various other tables may be created to rank subsets of the files 103 within the ordered list 112 among any or all of the other files. For example, once trained on the entire codebase tree 106a, the bug organizer API 108 may identify the top 10% in a given folder, or the top 10% of a given extension, feature, etc., of the entire codebase 102 Also, the bug organizer API 108 may rank a file as a certain percentile above 116 or below 118 a baseline file 114. Using a complete database 110 of the codebase 102, the bug organizer API 108 may analyze the entire codebase 102 to allow building complex combinations of queries for the metrics 310, 312, 314, 316, 318, 320, 322, 324, 402, and 404 or a weighted combination of the metrics.

Importantly, the data tables 300 and 400 may permit analysis and ranking of codebase files according to whether a file or subset of codebase files is more fault-prone than another file or files (e.g., a baseline file 114). Past bug identification and analysis techniques using only a cache of the codebase files did not allow fault risk analysis among files that were not in the cache. In other words, past cache-based systems for analyzing fault-prone code retained files in the cache that were considered fault prone, but these fault-prone files were not ranked one above another as more or less fault prone than other files in the codebase. The database system 100 employing the data tables 300 and 400 may permit the addition of other metrics to the analysis without completely retraining the bug organizer API 108 on the code tree 106a as required in a cache-based system.

A first data table 300 may be created by the bug organizer API 108 from the codebase files 103 and include at least some of the metrics described above. In some embodiments, the table 300 includes data for each of the files within the codebase as a data table record 301. The data may include the name of each file 310 selected from the codebase, a changelist ID 312, a number of lines of code in the file 314, a time of the last change to the file 316, a total number of changes to the file 318, a change density 320, a total number of bugs in the file 322, and a bug density 324 to name only a few possible types of data that may be stored in the table 300.

A second data table 400 may be created from the codebase files 103 and include at least some of the metrics described above. In some embodiments, the table 400 is created by the bug organizer API 108 and includes a file ID 310, a change list ID 312, a logical coupling relative metric 402, and a spatial relatives metric 404.

Figure 5:
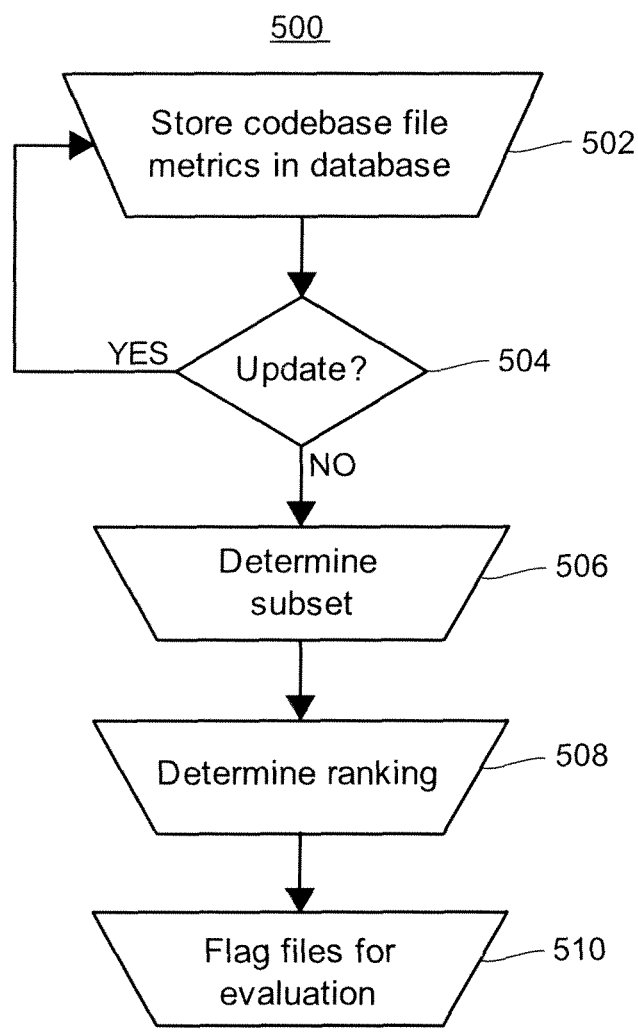
FIG. 5 is an exemplary block diagram of a method for identifying fault-prone code.

FIG. 5 illustrates an exemplary block diagram of a method 500 for analyzing a codebase 102 to identify fault-prone code. In some embodiments, the method 500 uses the system 100 and its various components as described herein. The method 300 may include one or more blocks, modules, functions or routines in the form of computer-executable instructions that are stored in a tangible computer-readable medium and executed using a processor of a computing device (e.g., a computing device of a three-dimensional modeling system, as described herein). The method 500 may be included as part of any of modules of a computing environment for a system 100 for analyzing code from a codebase 102 to identify files 103 and code that are most likely to include bugs. For example, the method 500 may be part of a bug organizer API 108 executing within a computing device of the system100. FIG. 5 is described with reference to FIGS. 1-4 for ease of explanation, but the method 500 can of course be utilized with other objects, APIs, user interfaces, etc., and implemented on the fault-prone code identification system 600 described below.

At block 502, the method 500 may store the metrics 204 and codebase files 103 of the codebase 102 and the various metrics in the bug analyzer database 110. In some embodiments, the bug organizer API 108 creates one or more tables (e.g., tables 300 and 400) and populates those tables with the metrics 204 portion of each file 200 within the database 110. The method 500 may populate the database 110 using files 301 that include a last change time 316 that is more recent that a particular threshold. For example, files having a last changed time 216 of greater than one month, six months, or another period may indicate that the file is generally stable and bug-free. Block 502 may be configured by a user to select files having a last changed time 216 according to a user-defined threshold (e.g., one month, six months, etc.). The API 108 may also store both the code 202 and metrics 204 portions of each file 200 in the database 110. To populate the database tables 300 and 400, the bug organizer API 108 may be trained on the code tree 106a to identify each folder, extension, etc., of the codebase 102 and organize the files 103 according to the metrics described above. The API 108 may first cycle through the files 103 of various codebase directories to collect the metrics 204 for each file ID. The API 108 may also cycle through the change list 107 to determine the number of bugs 322 for each file. In some embodiments, the API 108 may parse and analyze the codebase 102 and the change list IDs 107a and comments 107b for each codebase file to determine the total number of bugs for each file. For example, the API 108 may initiate a first loop to parse and analyze the codebase 102. The API 108 may then parse the comments 107b within each change list 107 that correspond to a change list ID 107a. A file corresponding to a file ID 310 that is associated with a change list ID 312 and a change list comment 107b including words that indicate a fixed bug (i.e., fix, bug, error, fault, glitch, issue, undocumented feature, challenge, design side effect, problem, etc.) will be a "hit" such that block 502 will increment the total number of bugs 322 corresponding to that file ID 310.

At block 504, each file entry within the data tables 300 and 400 may be updated to include the metrics or more information for one or more files as determined by the API 108 from the change lists 107 and other data. In some embodiments, the API 108 monitors the last change time 504 metric for files within the codebase 102 and executes block 504 if the last change time 316 metric is updated. In other embodiments, the API 108 monitors other metrics or a combination of metrics to determine when the database 110 and tables 300 and 400 should be updated. Block 504 ensures that the method 500 continuously updates the database 110 and tables 300 and 400 so that the ranking described below is an accurate representation of the current codebase 102. By ensuring that the database 110 includes an accurate representation of the current codebase 102, the method 600 is able to continuously rank the files in the database 110 and allows accounting for the introduction of fault-inducing code into the codebase files 103 as developers and other methods edit or add to the codebase 102.

At block 506, a subset of the records 301 for analysis may be determined. In some embodiments, a subset is determined as a query to the codebase 102 or the database 110 according to one or more criteria. For example, to analyze only C++ files, the bug organizer API 108 may initiate a query to the database 110 to select only those files 301 including a file ID 310 with a ".cpp" file extension. Additionally, the bug organizer API 108 may query a particular directory or sub-directory of the codebase 102 to retrieve a particular set of files 301 and populate the database 110 for later analysis. The API 108 may initiate a SQL-like string to create various subsets and determine a total number of files 301 within the subset.

At block 508, the files 301 may be ranked according to the metrics and averages of the metrics for the files retrieved from the database 110. In some embodiments, the files 301 may be rank ordered according one or more of the metrics 310, 312, 314, 316, 318, 320, 322, 324, 402, and 404 or a weighted combination of the metrics. Additionally, each ranking may then be totaled and averaged to determine an average ranking 326 for each file 301 based on the metrics. The method 500 may also determine each ranking 326 according to various file characteristics such as determining a file's overall percentile within the database 110 or within a targeted folder of the codebase 102. Also, the method 500 may also retrieve any files from the database 110 that include a metric that is above a given percentile threshold. In some embodiments, a baseline file 114 may be determined as including a metric ranking or an average ranking above or below which a file may be fault-prone and likely to include one or more bugs to be corrected. For example, a ranking 326 may be used as a limit in a query to the database 110 to determine files that should be flagged for further analysis.

At block 510, the method may flag each file 301 that includes a particular metric or total average 326 above a threshold value. In some embodiments, the block 510 may include a flag 230 for each file that includes an average ranking 326 or a ranking of a single metric 310, 312, 314, 316, 318, 320, 322, 324, 402, and 404, combination of metrics, or a weighted combination of the metrics above the baseline 114. The flag 230 may be used by another API to indicate which files are likely to be fault-prone. The flagged files may then be reviewed to determine if the file includes a bug and, if so, fixed.

Figure 6:
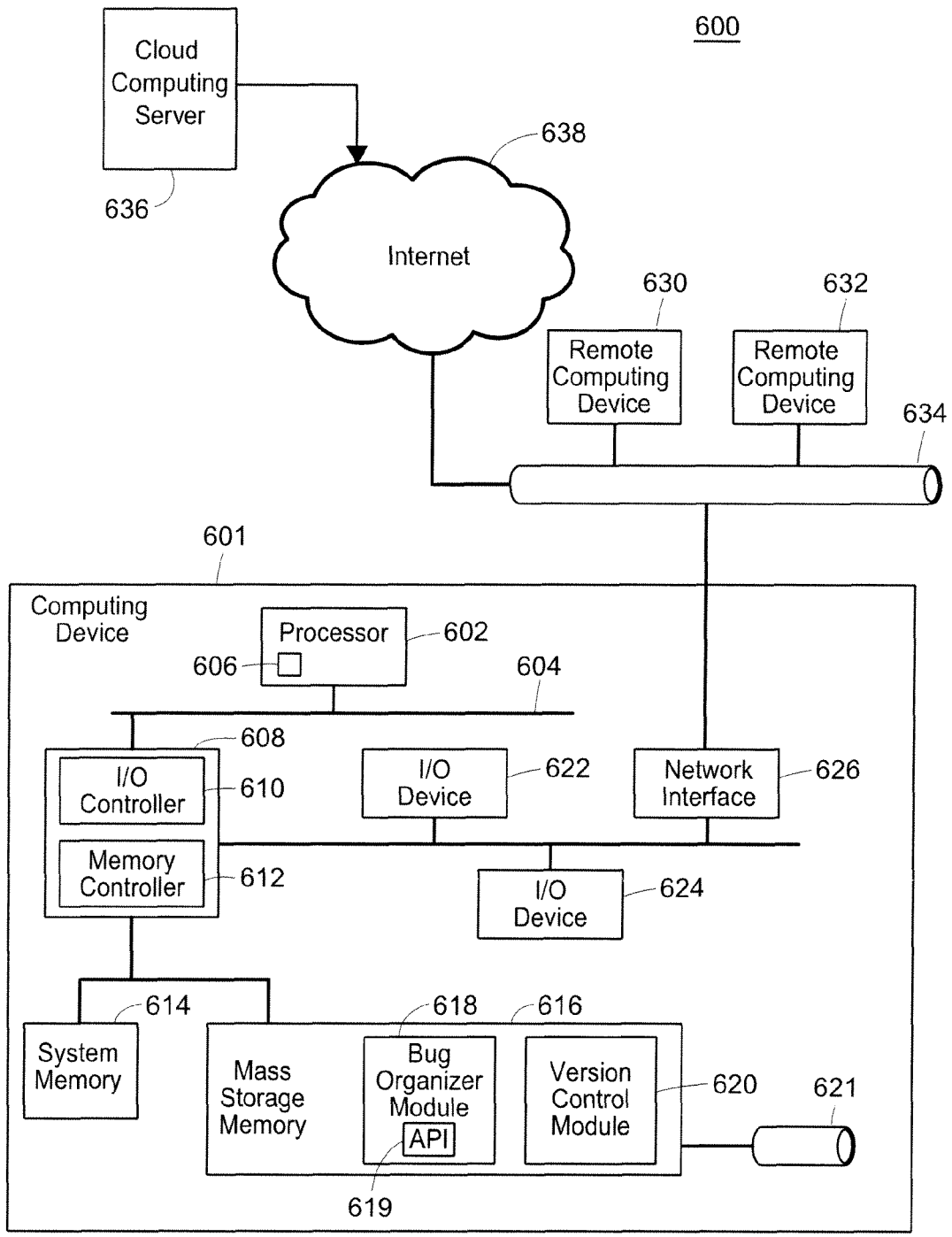
FIG. 6 is high-level block diagram of a computing environment that implements a system for identifying fault prone files within an application codebase.

FIG. 6 is a high-level block diagram that of an example computing environment for a fault-prone code identification system 600 having a computing device 601 that may be used to implement the method 500 for analyzing a codebase 102 to identify fault-prone code. The computing device 601 may include a personal computer, thin client, or other known type of computing device. As will be recognized by one skilled in the art, in light of the disclosure and teachings herein, other types of computing devices can be used that have different architectures. Processor systems similar or identical to the example fault-prone code identification system 600 may be used to implement and execute the example codebase 102, version control API 104, bug organizer API 108, and bug analyzer database 110 of FIG. 1, the exemplary codebase file 200 of FIG. 2, the tables of FIGS. 3 and 4, and the method of FIG. 5. Although the example fault-prone code identification system 600 is described below as including a plurality of peripherals, interfaces, chips, memories, etc., one or more of those elements may be omitted from other example processor systems used to implement and execute the example fault-prone code identification system 600. Also, other components may be added.

As shown in FIG. 6, the system 600 includes a processor 602 that is coupled to an interconnection bus 604. The processor 602 includes a register set or register space 606, which is depicted in FIG. 6 as being entirely on-chip, but which could alternatively be located entirely or partially off-chip and directly coupled to the processor 602 via dedicated electrical connections and/or via the interconnection bus 604. The processor 602 may be any suitable processor, processing unit or microprocessor. Although not shown in FIG. 6, the system 600 may be a multi-processor system and, thus, may include one or more additional processors that are identical or similar to the processor 600 and that are communicatively coupled to the interconnection bus 604.

The processor 602 of FIG. 6 is coupled to a chipset 608, which includes a memory controller 610 and a peripheral input/output (I/O) controller 612. As is well known, a chipset typically provides I/O and memory management functions as well as a plurality of general purpose and/or special purpose registers, timers, etc. that are accessible or used by one or more processors coupled to the chipset 608. The memory controller 610 performs functions that enable the processor 602 (or processors if there are multiple processors) to access a system memory 614 and a mass storage memory 616.

The system memory 614 may include any desired type of volatile and/or non-volatile memory such as, for example, static random access memory (SRAM), dynamic random access memory (DRAM), flash memory, read-only memory (ROM), etc. The mass storage memory 616 may include any desired type of mass storage device. For example, if the fault-prone code identification system 600 is used to implement a bug organizer module 618 having an API 619 and a version control module 620 (as described by the method 500 of FIG. 5), the mass storage memory 616 may include a hard disk drive, an optical drive, a tape storage device, a solid-state memory (e.g., a flash memory, a RAM memory, etc.), a magnetic memory (e.g., a hard drive), or any other memory suitable for mass storage. As used herein, the terms module, function, operation, procedure, routine, step, and method refer to computer program logic or computer executable instructions that provide the specified functionality to the computing device. Thus, a module, function, operation, procedure, routine, step, and method can be implemented in hardware, firmware, and/or software. In one embodiment, program modules and routines (e.g., the bug organizer module 618, the API 619, and the version control module 620 are stored in mass storage memory 616, loaded into system memory 614, and executed by a processor 602 or can be provided from computer program products that are stored in tangible computer-readable storage mediums (e.g. RAM, hard disk, optical/magnetic media, etc.). Mass storage 616 may also include a database 621 storing a plurality of codebase files 103, a version history 106, a code tree 106a, and change list 107 and a database interface module through which the bug organizer module 618, the API 619, the version control module 620, etc., may access the parametric objects 100.

The peripheral I/O controller 610 performs functions that enable the processor 602 to communicate with peripheral input/output (I/O) devices 622 and 624 and a network interface 626 via a peripheral I/O bus 628. The I/O devices 622 and 624 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The I/O devices 622 and 624 may be used with the bug organizer module 618 and version control 620 to receive attributes and formulas and display user interfaces as described in relation to FIG. 5, above. The network interface 628 may be, for example, an Ethernet device, an asynchronous transfer mode (ATM) device, an 802.11 wireless interface device, a DSL modem, a cable modem, a cellular modem, etc., that enables the fault-prone code identification system 600 to communicate with another computer system having at least the elements described in relation to the fault-prone code identification system 600.

While the memory controller 612 and the I/O controller 610 are depicted in FIG. 6 as separate functional blocks within the chipset 608, the functions performed by these blocks may be integrated within a single integrated circuit or may be implemented using two or more separate integrated circuits.

The fault-prone code identification system 600 may also implement the bug organizer module 618 and version control module 620 on remote computing devices 630 and 632. The remote computing devices 630 and 632 may communicate with the computing device 601 over an Ethernet link 634. For example, the computing device 601 may receive code base files 200 from a remote computing device 630, 632. In other embodiments, the bug organizer module 618 and/or the version control module 620 may be retrieved by the computing device 601 from a cloud computing server 636 via the Internet 638. When using the cloud computing server 636, the bug organizer module 618 and/or the version control module 620 may be programmatically linked with the computing device 601. The bug organizer module 618 and/or the version control odule 620 may be a Java® applet executing within a Java® Virtual Machine (JVM) environment resident in the computing device 601 or the remote computing devices 630, 632. The bug organizer module 618 and/or the version control module 620 may also be "plug-ins" adapted to execute in a web-browser located on the computing devices 601, 630, and 632.

Using the systems and procedures described above, a user can easily identify fault-prone code within a codebase within various subsets of the codebase and continuously rank the files according to their likelihood of presently including a bug. The subset may be created "on the fly" at any point in the lifetime of the codebase to instantly analyze code and understand the distribution of errors throughout the codebase. Furthermore, by providing a ranking of the likelihood that each file includes a bug, quality control systems and personnel are able to prioritize the correction of the fault-prone code. Likewise, identifying fault-prone code allows further analysis of the circumstances that lead to bugs and improvement of the metrics used to first identify the fault-prone code.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

For example, the system 600 may include but is not limited to any combination of a LAN, a MAN, a WAN, a mobile, a wired or wireless network, a private network, or a virtual private network. Moreover, while only two remote computing devices 630 and 632 are illustrated in FIG. 6 to simplify and clarify the description, it is understood that any number of client computers are supported and can be in communication within the system 600.

Additionally, certain embodiments are described herein as including logic or a number of components, modules, or mechanisms. Modules may constitute either software modules (e.g., code embodied on a machine-readable medium or in a transmission signal, wherein the code is executed by a processor) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" means that a particular element, feature, structure, or characteristic described in connection with the embodiment is included in at least one embodiment. The appearances of the phrase "in some embodiments" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a map editor system for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for a system and a process for identifying terminal road segments through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for identifying fault-prone code, the method comprising:

determining metrics corresponding to each codebase file of a plurality of codebase files within a codebase for an application;

storing the metrics corresponding to each codebase file of the plurality of codebase files in one or more records of a database table;

rank ordering the plurality of codebase files according to at least one metric;

flagging each codebase file having a ranking over a threshold value of the at least one metric;

for a specified codebase file of the plurality of codebase files, determining a subset of codebase files of the plurality of codebase files, wherein the subset of codebase files excludes the specified codebase file, and wherein each codebase file of the subset of codebase files has a logical coupling distance to the specified codebase file in accordance with a predetermined coupling distance threshold; and generating a fault likelihood for the specified codebase file based on a previously determined fault likelihood of one or more codebase files of the subset of codebase files, wherein the fault likelihood indicates how likely a change in the specified codebase file will generate a fault, wherein the metrics describe fault-inducing characteristics of the plurality of codebase files and include a total number of previous faults, a total number of changes that are associated with each codebase file, and a coupling distance determined for each codebase file, wherein the coupling distance for each codebase file is based on a measurement of a number of times the codebase file and another codebase file were changed together.

2. The method of claim 1, further comprising detecting a change to the plurality of codebase files and updating the metrics corresponding to each codebase file of the plurality of codebase files.

3. The method of claim 2, wherein rank ordering the plurality of codebase files according to at least one metric further includes continuously rank ordering the plurality of codebase files according to the updated metrics to account for fault-inducing changes to the plurality of codebase files.

4. The method of claim 1, wherein the metrics further include one or more of a codebase filename, a change list, a number of lines of code within the codebase file, a time the codebase file was last edited, a change density, a fault density, and spatial relatives.

5. The method of claim 4, wherein the change density includes a number of times the codebase file has been changed compared to the number of lines of code within the codebase file and the fault density includes the total number of faults compared to the number of lines of code within the codebase file.

6. The method of claim 4, wherein the spatial relatives include a measurement of a number of times a codebase file is changed in conjunction with a change action for another codebase file in a same folder or package as the codebase file.

7. The method of claim 1, wherein rank ordering the plurality of codebase files according to at least one metric includes determining a weighted average of the metrics for each codebase file and ranking the plurality of codebase files according to the weighted average.

8. The method of claim 1, wherein rank ordering the plurality of codebase files according to at least one metric includes rank ordering a subset of the plurality of codebase files according to at least one metric, wherein the subset includes a folder, an extension, a feature, or a package of a codebase file.

9. A non-transitory computer-readable medium storing instructions, the instructions when executed by a processor cause the processor to:
   determine metrics corresponding to each codebase file of a plurality of codebase files within a codebase for an application, wherein the metrics include a last change time indicating a time of a last change made to the corresponding codebase file;
   store the metrics corresponding to each codebase file in one or more records of a database table for each codebase file of the plurality of codebase files having a last change time metric that is more recent than a last time change threshold;
   rank order the plurality of codebase files according to at least one metric stored in the one or more records of the database table;
   flag each codebase file having a ranking over a threshold value of the metric;
   determine a subset of codebase files of the plurality of codebase files, wherein the subset of codebase files excludes the specified codebase file, and wherein each codebase file of the subset of codebase files has a logical coupling distance to the specified codebase file in accordance with a predetermined coupling distance threshold; and
   generate a fault likelihood for the specified codebase file based on a previously determined fault likelihood of one or more codebase files of the subset of codebase files, wherein the fault likelihood indicates how likely a change in the specified codebase file will generate a fault,
   detect a change to the plurality of codebase files;
   update the metrics corresponding to each codebase file of the plurality of codebase files; and
   continuously rank order the plurality of codebase files according to the updated metrics to account for fault-inducing changes to the plurality of codebase files,
   wherein the metrics describe fault-inducing characteristics of the plurality of codebase files and include a total number of previous faults, a total number of changes that are associated with each codebase file, and a measurement of a number of times a codebase file is changed in conjunction with a change action for another codebase file in a same folder or package as the codebase file.

10. The non-transitory computer-readable medium storing instructions of claim 9, wherein the metrics further include one or more of a change density, and a fault density.

11. The non-transitory computer-readable medium storing instructions of claim 10, wherein the change density includes a number of times the codebase file has been changed compared to a number of lines of code within the codebase file and the fault density includes a total number of faults compared to the number of lines of code within the codebase file.

12. A computer system for identifying fault-prone files of a codebase, the system comprising:
   a memory;
   a processor;
   a version control module stored in the memory and having an application programming interface defining functions that are executable by the processor to store codebase files within a codebase and manage a change list for tracking changes to the codebase files;
   a database stored in the memory and including a plurality of records that each store a set of metrics corresponding to each codebase file stored in the codebase; and
   a bug organizer module stored in the memory and having an application programming interface defining functions that are executable by the processor to determine the sets of metrics for each codebase file, store the sets of metrics in the records, and rank order the codebase files within a table of the database according to the sets of metrics;
   wherein the metrics describe fault-inducing characteristics of the plurality of codebase files and include a total number of previous faults, a total number of changes that are associated with each codebase file, a change density, a fault likelihood indicating how likely a change in a specified codebase file will generate a fault, and a fault density, wherein the change density includes a number of times the codebase file has been changed compared to the number of lines of code in the codebase file, wherein the fault likelihood for a specified codebase file is based on a previously determined fault likelihood of one or more codebase files of a subset of codebase files, wherein the subset of codebase files excludes the specified codebase file, wherein each codebase file of the subset of codebase files has a logical coupling distance to the specified codebase file in accordance with a predetermined coupling distance threshold, and wherein the logical coupling distance includes a measurement of a number of times a specified codebase file is changed in conjunction with a change action for another codebase file.

13. The computer system of claim 12, further comprising an update module stored in the memory and having an application programming interface defining functions that are executable by the processor to detect a change to the plurality of codebase files and update the metrics corresponding to each codebase file of the plurality of codebase files;
   wherein the bug organizer module application programming interface further defines functions that are executable by the processor to continuously rank order the plurality of codebase files according to the updated metrics to account for fault-inducing changes to the plurality of codebase files.

14. The computer system of claim 12, wherein the metrics further include spatial relatives.

15. The computer system of claim 14, wherein the spatial relatives include a measurement of a number of times a codebase file is changed in conjunction with a change action for another codebase file in a same folder or package as the codebase file.

16. The method of claim 1, further comprising rank ordering the plurality of codebase files into an ordered set of codebase files according to at least one metric;
   selecting a member codebase file of the ordered set of codebase files to be used as a baseline file, the at least one metric of the selected member codebase file having a first value; and
   determining that codebase files having a value of the at least one metric above or below the baseline file value are more or less likely to contain fault-prone code.

17. The method of claim 1, wherein the fault likelihood indicates how likely a change in the specified codebase file will generate a fault in one or more codebase files of the subset of codebase files.

* * * * *